United States Patent [19]

Cooke

[11] Patent Number: 4,579,578

[45] Date of Patent: Apr. 1, 1986

[54] PLANT GROWING MEDIA

[75] Inventor: Allan Cooke, Pontypool, Wales

[73] Assignee: Chemical Discoveries S.A., Panama, Panama

[21] Appl. No.: 614,278

[22] Filed: May 29, 1984

[30] Foreign Application Priority Data

Jun. 4, 1983 [GB] United Kingdom ............... 8315407
Jul. 7, 1983 [GB] United Kingdom ............... 8318448

[51] Int. Cl.$^4$ ............................................. C05F 11/00
[52] U.S. Cl. ........................................ 71/11; 71/903; 47/DIG. 10; 47/DIG. 11; 47/77
[58] Field of Search ......... 71/27, 903; 47/9, DIG. 10, 47/DIG. 7, DIG. 11, 77

[56] References Cited

U.S. PATENT DOCUMENTS 2,971,292 2/1961 Malecki ...................................... 71/1
3,207,592 9/1965 Harper et al. ............................ 71/27

FOREIGN PATENT DOCUMENTS 37138 10/1981 European Pat. Off.
72214 2/1983 European Pat. Off.
730464 of 1911 United Kingdom ............... 171/27
2054706 2/1981 United Kingdom.
2127005 4/1984 United Kingdom.

Primary Examiner—Ferris H. Lander
Attorney, Agent, or Firm—Pearson & Pearson

[57] ABSTRACT

A growing medium for plants is prepared by mixing a growing material with a highly water-absorbent polymer.

The polymer may be an acrylamide polymer cross-linked with methylene bisacrylamide which absorbs water to form a sticky gel.

The growing material may comprise rock wool.

4 Claims, No Drawings

PLANT GROWING MEDIA

FIELD OF THE INVENTION

This invention relates to growing media for plants.

BACKGROUND ART

With a view to improving the growing properties of sandy soils in desert regions it is well known to treat such soils with materials which act to limit water loss and also surface erosion. Known techniques include the incorporation of polystyrene particles in the soil and the application of an oil coating to the surface. However, such known techniques are not always wholly satisfactory in that they may be expensive and inconvenient to apply having regard to the large quantity of material required to produce an appreciable improvement, and because the resulting texture and composition of the growing medium may not be best suited to healthy, strong, plant growth.

DISCLOSURE OF THE INVENTION

One object of the present invention is to produce conveniently and inexpensively a growing medium having improved, beneficial growing properties.

According to the invention therefore there is provided a method of producing a growing medium wherein a mass of particulate growing material is mixed with a minor proportion of a synthetic polymeric substance which has the property of absorbing a volume of water appreciably greater than its own volume in a state in which said absorbed water is freely available for transfer from the polymeric substance to the root system of a plant growing in the medium.

With this technique it is possible to attain excellent water retention properties, even in the case where the said particulate material forming the bulk of the growing medium has poor properties in this respect, since water can be securely held by the polymeric substance with little tendency for undue losses to occur due to drainage or migration to the surface and evaporation, until such water is required for use by the plant. Moreover, due to its high water content, the polymeric substance can act, in use, to bind the growing medium and thereby give a firm, yet readily penetrable consistency well suited to healthy, strong plant growth. Further, in so far as appreciable benefits are obtained with only a minor proportion of the polymeric substance, the technique of the invention can be relatively convenient and inexpensive to apply. Also, having regard to the nature of the substances used, it is possible to achieve the abovementioned benefits without any adverse affects on plant health; and there need be no appreciable tendency for degradation of the medium to occur in use.

The said polymeric substance may be any suitable compound or mixture of compounds. However, in a particularly preferred embodiment the substance is an anionic polymer especially an acrylamide polymer, for example an acrylamide polymer cross-linked with methylene bisacrylamdie, which comprises particles or granules having the property of absorbing up to say 30 to 35 times its own volume of water by swelling of the particles to form moist, sticky gel-like beads. With this substance, preferably the force with which the water is bound to the polymer in the swollen beads is of the same order of magnitude as the capillary force effective in the plant's root system whereby in effect the polymeric substance acts as an extension to such root system giving rise to secure water retention yet permitting ready transference thereof to the plant. Advantageously, this substance can become attached in granular form to plant roots and consequently can improve the aeration porosity of the medium around the roots.

Preferably the polymeric substance may be incorporated in the growing medium in an amount representing less than 1% by volume and also 1% by weight of the medium.

In particular, the polymeric substance may be incorporated in the growing medium in the range of say one part per 100 to one part per 1000 related to the volume of the medium.

With regard to the said particulate growing material with which the polymeric substance is mixed, this may comprise any suitable substance or mixture of substances.

Thus, the said material may comprise a naturally occurring soil, such as a sandy soil in a desert region, and the polymeric substance may be mixed with this on site by any suitable manual or mechanical technique preferably such as to give a substantially homogeneous mix at least locally in an area in which plants are to be grown.

Alternatively, the said material may comprise one or more selected particulate substances of an inorganic and/or organic nature such as sand, rock wool, peat, etc. (especially rock wool which is particularly advantageous as discussed in detail hereinafter), the polymeric substance being mixed with this particulate substance or substances, preferably substantially homogeneously, and the resulting mixture being used by itself or in combination with a naturally occurring soil as a growing medium. For example, the mixture may be pre-prepared and then transferred to a desired site, being used for example to fill a trench or to cover an area in which plants are to be grown; or such pre-prepared mixture may be mixed with a naturally occurring soil removed from a site, the resulting mixture then being transferred back to the site. Agricultural machinery, such as fertilizer type spreaders and harrows may be used for site application. Alternatively, plants may be grown in pots or other receptacles filled with the mixture and, if desired such mixture together with the growing plant can be transferred subsequently to a desired site thereby to transplant to such site whilst at the same time improving the growing conditions thereat.

Most conveniently the polymeric substance is mixed with the particulate growing material in a dry state, water being added subsequently by deliberate watering or irrigation or by natural irrigation. It is, however, also possible to effect at least part of the mixing process with the polymeric substance in its water-absorbing state. This may be desirable where the polymeric substance is mixed with particulate growing material to form a body of growing medium to be used, for example, where plants are grown indoors or otherwise in controlled conditions prior to transplanting same to an outdoor site, in which case the presence of the polymeric substance in a moist condition facilitates coherence of the medium which can therefore be conveniently compressed to a desired size and shape, for example, pot-shaped.

Whilst it is visualised that the present invention will find particular application in the context of the provision of an improved growing medium in dry, sandy soils it is to be understood that the invention is not intended to be restricted to this field and the method thereof can be utilised to improve the growing properties of any suitable kinds of soils including both arid soils and muddy earths, and also can be utilised in the production of an artificial growing medium for use indoors in receptacles or outdoors in total substitution for a natural soil, or otherwise.

The said growing medium may further comprise small amounts of one or more additives in addition to said particulate material and said polymeric substance, such as plant nutrients and binding materials. In the latter respect it can be advantageous to incorporate one or more materials which can act to bind the growing medium at least at the surface thereof to limit wind and water erosion. A suitable binding material is a water-soluble polyelectrolyte of higher molecular weight such as an acrylamide/acrylic acid polymer which is malleable when moist but forms a hard crust on the surface of the growing medium as it dries, such crust advantageously stabilizing the growing medium and also providing a protective action in so far as it has the effect, for example, of preventing birds from removing seeds from the medium and of preventing water evaporation whilst allowing ingress of water and oxygen which gives a warm, moist, aerated environment beneath the surface ideally suited to rapid germination.

BEST MODE FOR CARRYING OUT THE INVENTION

In one example of the invention a major proportion of rock wool is mixed with a minor proportion of a water-absorbent polymer and a polymeric binder.

Rock wool is a spongy absorbent fibrous inorganic material which is in slabs from volcanic rock by application of high temperature and pressure thereto. This material is conventionally used as a thermal insulation material in buildings.

The water-absorbent polymer is a semi-soluble acrylamide polymer cross-linked with methylene bisacrylamide.

The polymeric binder is a water-soluble polyelectrolyte with a high molecular weight, namely a 70/30 acrylamide/acrylic acid polymer.

The ingredients are mixed with the polymers in the dry state in the form of grains or particles by mechanical spinning to cause the polymer particles to penetrate and disperse amongst the rock wool substantially uniformly.

This mixture which may contain 0.5% to 2% polymer can then be mixed with sand say in the ratio of 5 kg to 10 kg of the polymer/rock wool mixture to one tonne sand.

The resulting medium can be used by itself or as an addition to naturally occurring soil and provides an excellent growing medium, although it may be necessary to add plant nutrients depending on the conditions of use.

The rock wool provides an excellent fibrous structure giving a secure basis for healthy root propagation. The water-absorbent polymer improves the water-retaining properties of the rock wool (up to 500 times improvement may be possible dependent on the mixture) and acts to impart a loamy texture due to its moist, sticky nature. The polymeric binder helps to stabilize the medium and in particular forms a strong crust at the surface where it dries.

Strong healthy plant growth is thereby facilitated for surface and deeply-rooted crops of all kinds. Moreover the medium is generally of an "inert" nature in that the ingredients do not tend to exert any adverse chemical or other affect on the plants, and also the ingredients do not readily deteriorate. The medium can be used repeatedly; it can tolerate adverse environment conditions, and can be readily "reactivated" (without degeneration of beneficial properties) by watering after any dehydration thereof.

The polymeric substance used in the above example and also other embodiments of the invention may be formed by polymerising an acrylamide monomer in the presence of N,N'-methylene bisacrylamide as cross-linking agent, the reaction conditions being selected to give in effect a three-dimensional polymeric matrix having multiple free chain ends. In this way the resulting polymer may absorb water to give a firm, gel-like material which is sticky or tacky so as to be capable of adhering to plant roots. Also, the matrix can entrap water droplets so that evaporation is restricted whilst migration through the matrix to the plant roots can readily occur.

In more detail, the polymer may be formed as follows:

Acrylamide monomer (such as the material sold by BDH under the trade name ACRYLOGEL) is mixed with additional N,N'-methylene bisacrylamide cross-linking agent in concentrated aqueous solution, the acrylamide representing say 5% to 20% by weight and the cross-linking agent up to say 5% (preferably up to 2%) of the weight of the monomer. Ammonium persulphate and tetramethylethylenediamine are added for initiation purposes and the reaction proceeds exothermically. The reaction temperature may be maintained at say up to 60° C. and oxygen may be excluded to prevent premature termination.

In this way a "rubbery" gel is formed having a sticky or tacky consistency. This is washed with water to remove unreacted acrylamide monomer and may be chopped or otherwise physically divided into small globules or the like.

The physical properties of the resulting polymer depends on the exact nature of the reaction conditions as illustrated in the following example preparations.

In each case the described gellation rection was allowed to proced for 24 hours. The gel was then swollen overnight in 1.5 liters of distilled water. The excess water was decanted/filtered from the gel. This procedure was repeated until the gel had been washed with a minimum of 10 liters of distilled water.

The gel was then dried to constant weight at 60° C. in a vacuum oven under night high vacuum. The dried gel obtained was tough and very brittle.

All the gels were recovered in this manner and stored in the dry form.

EXAMPLE PREPARATION 1

20 g acrylamide and N,N'-methylene bisacrylamide together with ammonium persulphate (0.16 g) were charged into a one-liter emulsion polymerisation vessel containing an air condenser and nitrogen bubbler. These were dissolved in 400 ml of distilled water and dry nitrogen passed through the solution for one hour. Tetramethylenediamine (TEMED) 160 µl was then added and the polymerization mixture was then left under nitrogen for 24 hours.

The quantity of cross-linking agent was varied, in successive runs of the preparation, between 0.21 gms and 1 gm (1% to 5% by weight of the monomer) the resulting polymer weight varying correspondingly between 22.56 and 21.22 gms.

The degree of opaqueness and the rate at which the solution gelled were both dependent on the concentration of the cross-linking agent. The most opaque gel was that containing 5% cross-linking agent and it was formed (i.e. the reaction mixture gelled) in the shortest time, approximately 60 minutes.

The resulting dried gel swelled to give a clear gel in distilled water. The degree of swelling was 1 g gel to 10 g water in about three hours (in the case of 1% cross-linking agent) and ultimately about 1 g to 30 gs (overnight).

EXAMPLE PREPARATION 2

10 g acrylamide and N,N'-methylene bisacrylamide were charged into a 250 ml round-bottomed three-necked flask equipped with a condenser and nitrogen bubbler. Ammonium persulphate (0.08 g) was added and the reagents dissolved in 200 ml of distilled water. Dry nitrogen was constantly bubbled through the solution. The polymerisation was allowed to continue for 24 hours under a nitrogen atmosphere.

The quantity of cross-linking agent was varied, in successive runs of the preparation between 0.1 and 0.5 gms (1% to 5% by weight of the monomer) the resulting polymer weight varying correspondingly between 9.66 and 11.20.

The gels were all formed within 90 minutes of the initiator being added. The time being shortest in the case of the 5% cross-linking agent.

The dried gel had an off-white appearance and was very tough and brittle.

The gels formed with low percentage cross-linking agent (1 and 2%) were extremely "tacky".

The dried gel swelled to give a clear gel in distilled water. The degree of swelling was 1 g gel to 15 g water in about three hours (for 1% cross-linking agent) and ultimately about 1 g to 30 gms (overnight).

EXAMPLE PREPARATION 3

20 g acrylamide and N,N'-methylene bisacrylamide were charged into a one-liter emulsion polymerisation vessel containing an air condenser and nitrogen bubbler. These were dissolved in 400 ml of distilled water and dry nitrogen passed through the solution for 30 minutes. At this point 1 ml of a 160 mg/ml solution of ammonium persulphate was injected as the initiator. The reaction vessel was then held at 50° C. under a nitrogen atmosphere for 24 hours.

The quantity of cross-linking agent was varied, in successive runs of the preparation between 0.2 and 1.0 gms (1% to 5% by weight of the monomer) the resulting polymer weight varying correspondingly between 21.41 and 23 gms.

The gels were all formed within 45–60 minutes of the initiator being added (depending on the amount of cross-linking agent).

The dried gel had a pale yellow appearance and was very tough and brittle.

The gels produced, especially with low percentage cross-linking agent (1 and 2%) were "tacky" and adhered readily to surfaces.

The dried gel swelled to give a clear gel in distilled water. The degree of swelling was 1 g of gel to 12 g water in about three hours (for 1% cross-linking agent) and ultimately about 1 g to 30 gms (overnight).

The polymer feasibly may also be made in a two-shot, rather than a one-shot, process.

It is of course to be understood that the invention is not intended to be restricted to the details of the above examples which are described by way of illustration only. Thus, for example, although the method of the invention finds particular application in the context of improving the growing properties of a medium, the method may additionally be used in a civil engineering context for example to effect stabilization (and possibly to facilitate the growth of stabilizing plants such as grass) in muddy river banks, road sides etc.

I claim:

1. A method of producing a growing medium comprising the steps of:
   polymerizing an acrylamide monomer with N,N'-methylene bisacrylamide cross-linking agent in the presence of water and an initiator, said cross-linking agent amounting to less than 5% by weight of the monomer, and the reaction conditions of said polymerization being selected, so that a polymeric substance is formed which is capable of absorbing at least 30 times its own volume of water to form a firm gel which is of a sticky or tacky consistency sufficient to adhere to the roots of a plant and to permit free migration of water from the gel into the plant roots;
   dividing the polymeric substance into particles;
   mixing a minor proportion of said particles with a major proportion of a particulate growing material consisting of rock wool; said polymeric substance comprising not greater than 1% by weight of said medium.

2. A method according to claim 1, characterized in that said growing medium further incorporates a polymeric binder.

3. A method according to claim 2, characterized in that said binder is an acrylamide/acrylic acid polymer.

4. A growing medium comprising a mixture of a particulate growing material consisting of rock wool with a particulate synthetic polymeric substance, characterized in that said polymeric substance represents up to 1% by weight of the medium, and said polymeric substance comprises an acrylamide polymer cross-linked with less than 5% by weight (relative to the acrylamide) of N,N'-methylene bisacrylamide and which absorbs at least 30 times its own volume of water to form a sticky gel which can adhere to roots of a plant growing in said medium and make said absorbed water freely available for transfer from the polymeric substance to the root system of the plant.

* * * * *